US010574635B2

(12) United States Patent
Zhang et al.

(10) Patent No.: US 10,574,635 B2
(45) Date of Patent: Feb. 25, 2020

(54) AUTHENTICATION AND AUTHORIZATION IN PROXIMITY BASED SERVICE COMMUNICATION

(71) Applicant: NEC Corporation, Tokyo (JP)

(72) Inventors: Xiaowei Zhang, Tokyo (JP); Anand Raghawa Prasad, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/667,900

(22) Filed: Aug. 3, 2017

(65) Prior Publication Data

US 2017/0359322 A1 Dec. 14, 2017

Related U.S. Application Data

(63) Continuation of application No. 14/899,785, filed as application No. PCT/JP2014/003167 on Jun. 13, 2014, now abandoned.

(30) Foreign Application Priority Data

Jun. 28, 2013 (JP) .................................. 2013-137293

(51) Int. Cl.
*H04L 29/06* (2006.01)
*H04L 9/08* (2006.01)
(Continued)

(52) U.S. Cl.
CPC .............. *H04L 63/06* (2013.01); *H04L 9/088* (2013.01); *H04L 9/0833* (2013.01);
(Continued)

(58) Field of Classification Search
CPC .............................. H04L 63/06; H04L 9/0833
(Continued)

(56) References Cited

U.S. PATENT DOCUMENTS 7,783,777 B1* 8/2010 Pabla ................ G06F 17/30206
709/238
2004/0098588 A1* 5/2004 Ohba ...................... H04L 63/08
713/169
(Continued)

FOREIGN PATENT DOCUMENTS

JP 2007-166538 A 6/2007
JP 2012-110035 A 6/2012
WO WO-2012/088470 A1 6/2012

OTHER PUBLICATIONS

3GPP TR 21.905, Vocabulary for 3GPP Specifications, V12.0.0 (Jun. 2013) (Release 12) (pp. 1-64).
(Continued)

*Primary Examiner* — Haresh N Patel
(74) *Attorney, Agent, or Firm* — Wilmer Cutler Pickering Hale and Dorr LLP

(57) ABSTRACT

A method of performing authentication and authorization in Proximity based Service (ProSe) communication by a requesting device (31) which sends a request of a communication and a receiving device (32) which receives the request from the requesting device (31) and (32), the method including deriving session keys Kpc and Kpi from an unique key Kp at the requesting and receiving devices (31) and (32), using the session keys Kpc and Kpi for ProSe communication setup and direct communication between the requesting and receiving devices (31) and (32), starting the direct communication with the requesting and receiving devices (31) and (32). The key Kpc is confidentiality key and the key Kpi is integrity protection key.

12 Claims, 9 Drawing Sheets

(51) Int. Cl.
| | |
|---|---|
| *H04L 9/32* | (2006.01) |
| *H04W 12/02* | (2009.01) |
| *H04W 12/10* | (2009.01) |
| *H04W 12/04* | (2009.01) |
| *H04W 76/14* | (2018.01) |
| *H04L 29/08* | (2006.01) |
| *H04W 76/10* | (2018.01) |
| *H04W 4/80* | (2018.01) |

(52) U.S. Cl.
CPC ............ *H04L 9/3242* (2013.01); *H04L 63/08* (2013.01); *H04W 12/02* (2013.01); *H04W 12/04031* (2019.01); *H04W 12/10* (2013.01); *H04W 76/14* (2018.02); H04L 2209/80 (2013.01); H04W 4/80 (2018.02); H04W 76/10 (2018.02)

(58) Field of Classification Search
USPC .......................................................... 726/4
See application file for complete search history.

(56) References Cited

U.S. PATENT DOCUMENTS

| | | | | |
|---|---|---|---|---|
| 2006/0190601 | A1* | 8/2006 | Lee | H04L 63/0892 709/225 |
| 2006/0212928 | A1* | 9/2006 | Maino | H04L 9/0841 726/4 |
| 2006/0284982 | A1* | 12/2006 | Bigioi | H04N 1/00145 348/207.1 |
| 2007/0294186 | A1* | 12/2007 | Yan | G06Q 20/3829 705/71 |
| 2009/0254392 | A1* | 10/2009 | Zander | G06F 21/6218 705/50 |
| 2010/0069067 | A1 | 3/2010 | Vanderveen et al. | |
| 2010/0316217 | A1 | 12/2010 | Gammel et al. | |
| 2011/0041003 | A1* | 2/2011 | Pattar | H04W 12/10 714/4.3 |
| 2011/0307694 | A1 | 12/2011 | Broustis et al. | |
| 2013/0059578 | A1* | 3/2013 | Finberg | G06F 11/0748 455/425 |
| 2013/0077512 | A1* | 3/2013 | Chang | H04W 56/001 370/252 |
| 2013/0081051 | A1* | 3/2013 | Levien | G06F 9/5027 718/106 |
| 2013/0110920 | A1 | 5/2013 | Broustis et al. | |
| 2013/0163762 | A1* | 6/2013 | Zhang | H04B 7/155 380/270 |
| 2013/0286425 | A1* | 10/2013 | Nakamura | G06F 3/1204 358/1.13 |
| 2013/0288668 | A1* | 10/2013 | Pragada | H04W 12/06 455/426.1 |
| 2013/0290696 | A1* | 10/2013 | Broustis | H04L 9/08 713/150 |
| 2013/0324114 | A1* | 12/2013 | Raghothaman | H04W 8/005 455/426.1 |
| 2013/0326224 | A1* | 12/2013 | Yavuz | H04L 9/3247 713/176 |
| 2014/0026180 | A1* | 1/2014 | Baglin | H04W 12/04 726/1 |
| 2014/0036685 | A1* | 2/2014 | Kim | H04W 48/20 370/236 |
| 2014/0052458 | A1 | 2/2014 | Ghazvini et al. | |
| 2014/0169557 | A1 | 6/2014 | Gammel et al. | |
| 2014/0334388 | A1* | 11/2014 | Novak | H04W 72/1263 370/329 |
| 2015/0043429 | A1* | 2/2015 | Kim | H04W 80/04 370/328 |
| 2015/0087233 | A1* | 3/2015 | Kim | H04W 76/14 455/41.2 |

OTHER PUBLICATIONS

3GPP TR 22.803, Feasibility study for Proximity Services (ProSe), V12.1.0 (Mar. 2013) (Release 12) (pp. 1-45).
3GPP TR 23.703, Study on architecture enhancements to support Proximity Services (ProSe) V0.4.1 (Jun. 2013) (Release 12) (pp. 1-85).
International Search Report corresponding to PCT/JP2014/003167 dated Nov. 6, 2014 (4 pages).
Chinese Office Action issued by the State Intellectual Property Office of the People's Republic of China for Chinese Application No. 201480036520.6 dated Mar. 30, 2018 (13 pages).
U.S. Office Action issued by the U.S. Patent and Trademark Office for U.S. Appl. No. 14/899,785 dated Jan. 13, 2017 (9 pages).
Notification of Reasons for Refusal issued by the Japan Patent Office for Japanese Application No. 2015-561773 dated Aug. 7, 2018 (9 pages).
Extended European Search Report issued in European Patent Application No. 19187961.8, dated Sep. 5, 2019, 8 pages.

* cited by examiner

UEa: Requesting UE
UEb: Receiving UE

One-to-one

UEa: Requesting UE
UEb, UEc: Receiving UE

One-to-many

UEa: Requesting UE
UEb, UEc, UEn: Receiving UE

Many-to-many

AUTHENTICATION AND AUTHORIZATION IN PROXIMITY BASED SERVICE COMMUNICATION

CROSS-REFERENCE TO RELATED APPLICATIONs

The present application is a continuation of now abandoned U.S. patent application Ser. No. 14/899,785, entitled "Security for Prose Group Communications," Dec. 18, 2015, which is a national stage application of International Application No. PCT/JP2014/003167 entitled "Security for Prose Group Communication" filed Jun. 13, 2014, which claims priority to Japanese Application No. 2013-137293 filed on Jun. 28, 2013, the disclosures of each of which are hereby incorporated by reference in their entirety.

TECHNICAL FIELD

This invention is related to a secure system and a method of performing authentication and authorization, more specifically, to a method of performing the authentication and the authorization in Proximity based Service (ProSe) communication.

BACKGROUND ART

3GPP (3rd Generation Partnership Project) has started to study Proximity based Services (ProSe) for both commercial and public safety uses. 3GPP SA1 (Services Working Group) has initiated some security requirements for secure communication, UE (User Equipment) identity, and privacy protection.

ProSe represents a recent and enormous socio-technological trend. The principle of these applications is to discover instances of the applications running in devices that are within proximity of each other, and ultimately to also exchange application-related data. In parallel to this, there is interest in proximity-based discovery and communications in the public safety community.

ProSe communication can provide services to the UEs in proximity via an eNB (Evolved Node B) or without the eNB. The SA1 requires that the ProSe service be provided to UEs with or without network coverage. The UEs can discover other nearby UEs or be discovered by other UEs, and they can communicate with each other. Some use cases can be found in NPL 1.

CITATION LIST

Non Patent Literature

NPL 1: 3GPP TR 22.803 Feasibility study for Proximity Services (ProSe), (Release 12)

SUMMARY OF INVENTION

Technical Problem

However, despite the security issues involving authentication and authorization for direct communication as well as privacy issues, 3GPP SA3 offers no security solution.

Solution to Problem

The present invention has been made to present an overall security solution for the above-mentioned security issues.

In one embodiment, there is provided a method of performing authentication and authorization in Proximity based Service (ProSe) communication by a requesting device which sends a request of a communication and a receiving device which receives the request from the requesting device, the method including deriving session keys Kpc and Kpi from an unique key Kp at the requesting and receiving devices, using the session keys Kpc and Kpi for ProSe communication setup and direct communication between the requesting and receiving devices, starting the direct communication with the requesting and receiving devices. The key Kpc is confidentiality key and the key Kpi is integrity protection key.

In another embodiment, there is provided a secure system including a plurality of User Equipments (UEs), and a Proximity based Service (ProSe) server, including a requesting device which sends a request of a communication, and a receiving device which receives the request from the requesting device. The requesting and receiving devices derive session keys Kpc and Kpi from an unique key Kp. The requesting and receiving devices use the session keys Kpc and Kpi for ProSe communication setup and direct communication between the requesting and receiving devices. The requesting and receiving devices start the direct communication with the requesting and receiving devices. The key Kpc is confidentiality key and the key Kpi is integrity protection key.

Advantageous Effects of Invention

A secure system and a method of making a secure communication can present an overall security solution for security issues.

BRIEF DESCRIPTION OF DRAWINGS

The above and other objects, advantages and features of the present invention will be more apparent from the following description of certain preferred embodiments taken in conjunction with the accompanying drawings, in which.

DESCRIPTION OF EMBODIMENTS

Figure 1A:
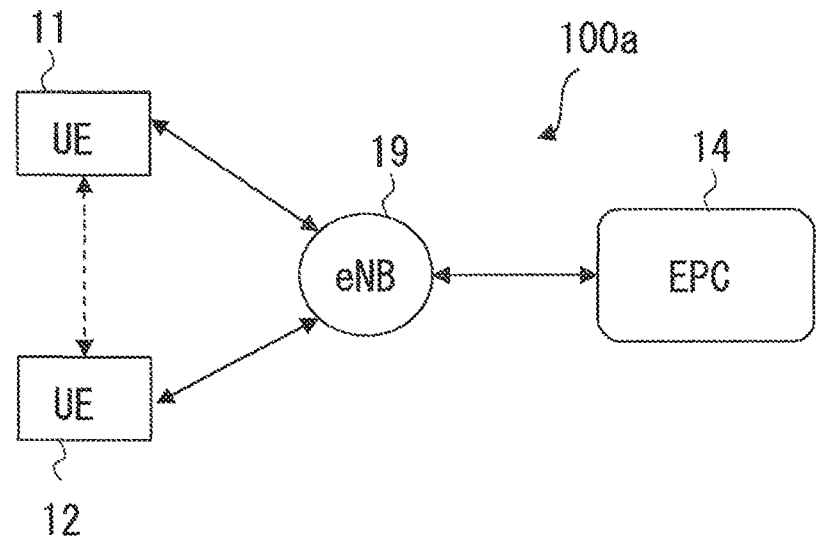
FIG. 1A is a schematic view showing the ProSe Communication scenario in NPL 1.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to exemplary embodiments disclosed herein are not to be considered as limiting.

In the exemplary embodiments, though the security solutions with a focus on specifically direct communication, discovery, and communication will be explained, the solutions can be applied to other communications as well.

Firstly, definitions given in 3GPP TR 21.905: "Vocabulary for 3GPP Specifications" will be explained.
ProSe Direct Communication:

A communication between two or more UEs in proximity that are ProSe-enabled, by means of user plane transmission using E-UTRAN technology via a path not traversing any network node.
ProSe-enabled UE:

A UE that supports ProSe requirements and associated procedures. Unless explicitly stated otherwise, a Prose-enabled UE refers both to a non-public safety UE and a public safety UE.
ProSe-enabled Public Safety UE:

A ProSe-enabled UE that also supports ProSe procedures and capabilities specific to Public Safety.
ProSe-enabled non-public safety UE:

A UE that supports ProSe procedures but not capabilities specific to public safety.
ProSe Direct Discovery:

A procedure employed by a ProSe-enabled UE to discover other ProSe-enabled UEs in its vicinity by using only the capabilities of the two UEs with rel.12 E-UTRAN technology.
EPC-level ProSe Discovery:

A process by which the EPC determines the proximity of two ProSe-enabled UEs and informs them of their proximity.

Figure 1B:
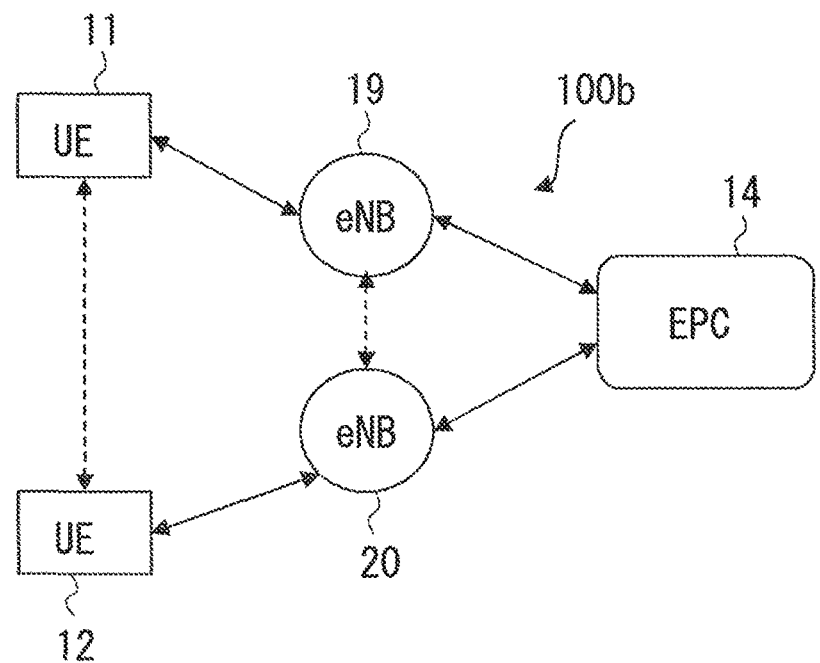
FIG. 1B is a schematic view showing the ProSe Communication scenario in NPL 1.

FIGS. 1A and 1B are schematic views showing the ProSe Communication scenarios in NPL 1. When a UE 11 and a UE 12 which are involved in the ProSe Communication are served by the same eNB 19 and network coverage is available, a system 100a can decide to perform ProSe Communication using control information exchanged between the UEs 11, 12, eNB 19 and an EPC (Evolved Packet Core) 14 (e.g., session management, authorization, security) as shown by the solid arrows in FIG. 1A. For charging, modifications should be minimized with respect to the existing architecture. The UEs 11 and 12 can in addition exchange control signaling via the ProSe Communication path as shown by the dashed arrow in FIG. 1A.

When the UEs 11 and 12 involved in the ProSe Communication are served by different eNBs 19, 20 and network coverage is available, a system 100b can decide to perform ProSe Communication using control information exchanged between the UEs 11, 12, eNB 19 and the EPC 14 (e.g., session management, authorization, security) as shown by the solid arrows in FIG. 1B. In this configuration, the eNBs 19 and 20 may coordinate with each other through the EPC 14 or communicate directly for radio resource management as shown by the dashed arrow between the eNBs 19 and 20 in FIG. 1B. For charging, signaling modifications should be minimized with respect to the existing architecture. The UEs 11 and 12 can in addition exchange control signaling via the ProSe Communication path as shown by the dashed arrow between the UE 11 and the UE 12 in FIG. 1B.

If network coverage is available for a subset of the UEs, one or more Public Safety UEs may relay the radio resource management control information for other UEs that do not have network coverage.

If network coverage is not available, the control path can exist directly between Public Safety UEs. In this configuration, the Public Safety UEs can rely on pre-configured radio resources to establish and maintain the ProSe Communication. Alternatively, a Public Safety Radio Resource Management Function, which can reside in a Public Safety UE, can manage the allocation of radio resources for Public Safety ProSe Communication.

Figure 2:
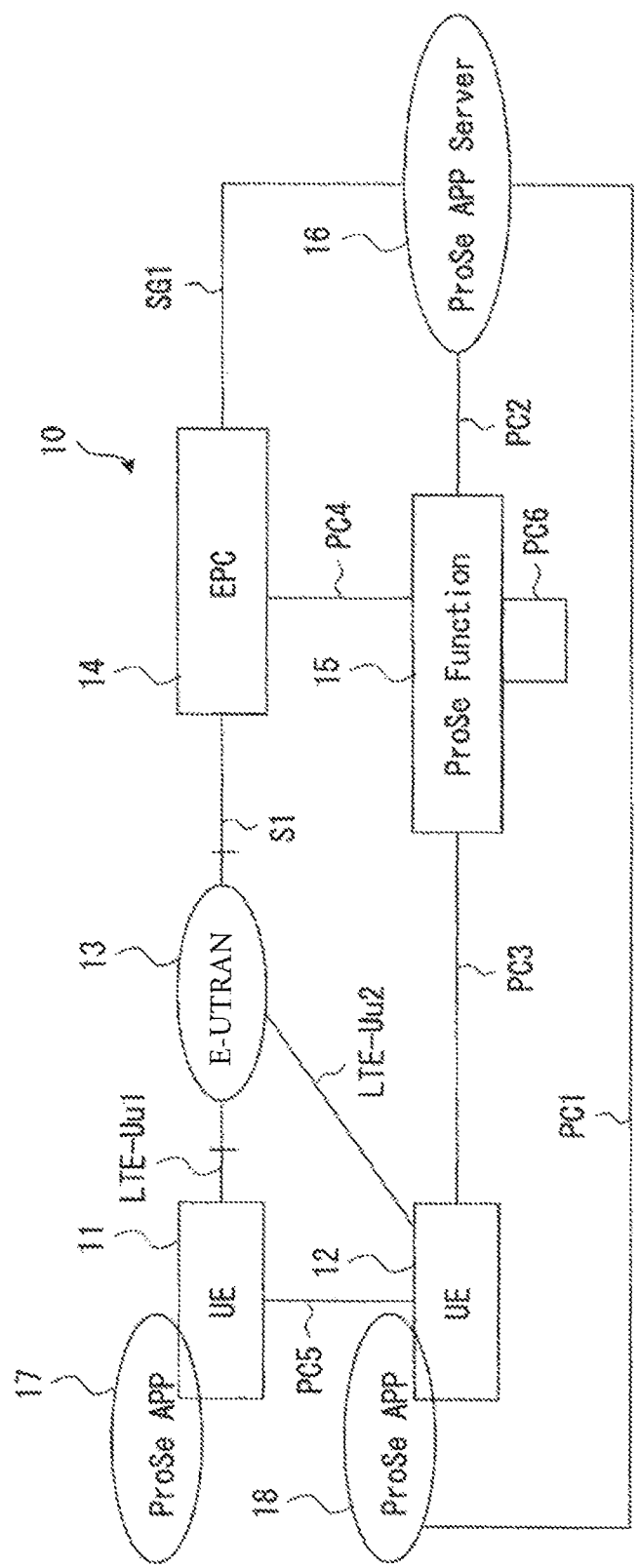
FIG. 2 is a schematic view showing an example of the systems which provide a method of making a secure communication according to an exemplary embodiment of the present invention.

FIG. 2 is a schematic view showing an example of the systems which provide a method of making a secure communication according to an exemplary embodiment of the present invention. As shown in FIG. 2, a system 10 includes the UE 11, the UE 12, an E-UTRAN 13, the EPC 14, a ProSe Function 15, a ProSe APP Server 16, a ProSe APP 17, and a ProSe APP 18.

The UE 11 and the UE 12 can communicate through a PC5, the UE 11 and the E-UTRAN 13 communicate through LTE-Uu1, and the UE 12 can communicate with the E-UTRAN 13 and the ProSe Function 15 through LTE-Uu2 and a PC3, respectively. The EPC 14 and the ProSe Function 15 can communicate through a PC4, the ProSe APP server 16 can communicate with the EPC 14 and the ProSe APP 18 through a SG1 and a PC1, respectively, and the ProSe Function 15 can communicate by itself through a PC6.

As described above, existing keys can be used when using an infrastructure, i.e., via eNodeB. However, a new solution is needed for device-to-device direct discovery and communication; for example, a key can be sent from the network to communicating parties, a key can be created between communicating parties, or a similar algorithm for negotiation can be used directly or via the network. Further, a new solution is also needed for the security over the unlicensed spectrum.

Two different modes for ProSe Direct Communication one-to-one are supported:

Network independent direct communication: This mode of operation for ProSe Direct Communication does not require any network assistance to authorize the connection and communication is performed by using only functionality and information local to the UE. This mode is applicable only to pre-authorized ProSe-enabled Public Safety UEs, regardless of whether the UEs are served by E-UTRAN or not.

Network authorized direct communication: This mode of operation for ProSe Direct Communication always requires network assistance and may also be applicable when only one UE is "served by E-UTRAN" for Public safety UEs. For non-Public Safety UEs both UEs must be "served by E-UTRAN".

PC1:

It is the reference point between the ProSe application 18 in the UE 12 and in the ProSe App Server 16. It is used to define application level requirements.

PC2:

It is the reference point between the ProSe App Server 16 and the ProSe Function 15. It is used to define the interaction between the ProSe App Server 16 and ProSe functionality provided by the 3GPP EPS via the ProSe Function 15. One example of use of it may be for application data updates for a ProSe database in the ProSe Function 15. Another example of use of it may be data for use by the ProSe App Server 16 in interworking between 3GPP functionality and application data, e.g. name translation.

PC3:

It is the reference point between the UE 12 and the ProSe Function 15. It is used to define the interaction between the UE 12 and the ProSe Function 15. An example of use of it is for configuration for ProSe discovery and communication.

PC4:

It is the reference point between the EPC 14 and the ProSe Function 15. It is used to define the interaction between the EPC 14 and the ProSe Function 15. Possible use cases of it may be when setting up a one-to-one communication path between UEs or when validating ProSe services (authorization) for session management or mobility management in real time.

PC5:

It is the reference point between the UE 11 to the UE 12 used for control and user plane for discovery and communication, for relay and one-to-one communication (between UEs directly and between UEs over LTE-Uu).

PC6:

This reference point may be used for functions such as ProSe Discovery between users which are subscribed to different PLMNs.

SGi:

In addition to the relevant functions defined in TS 29.061 [10] via SGi, it may be used for application data and application level control information exchange.

Figure 3:
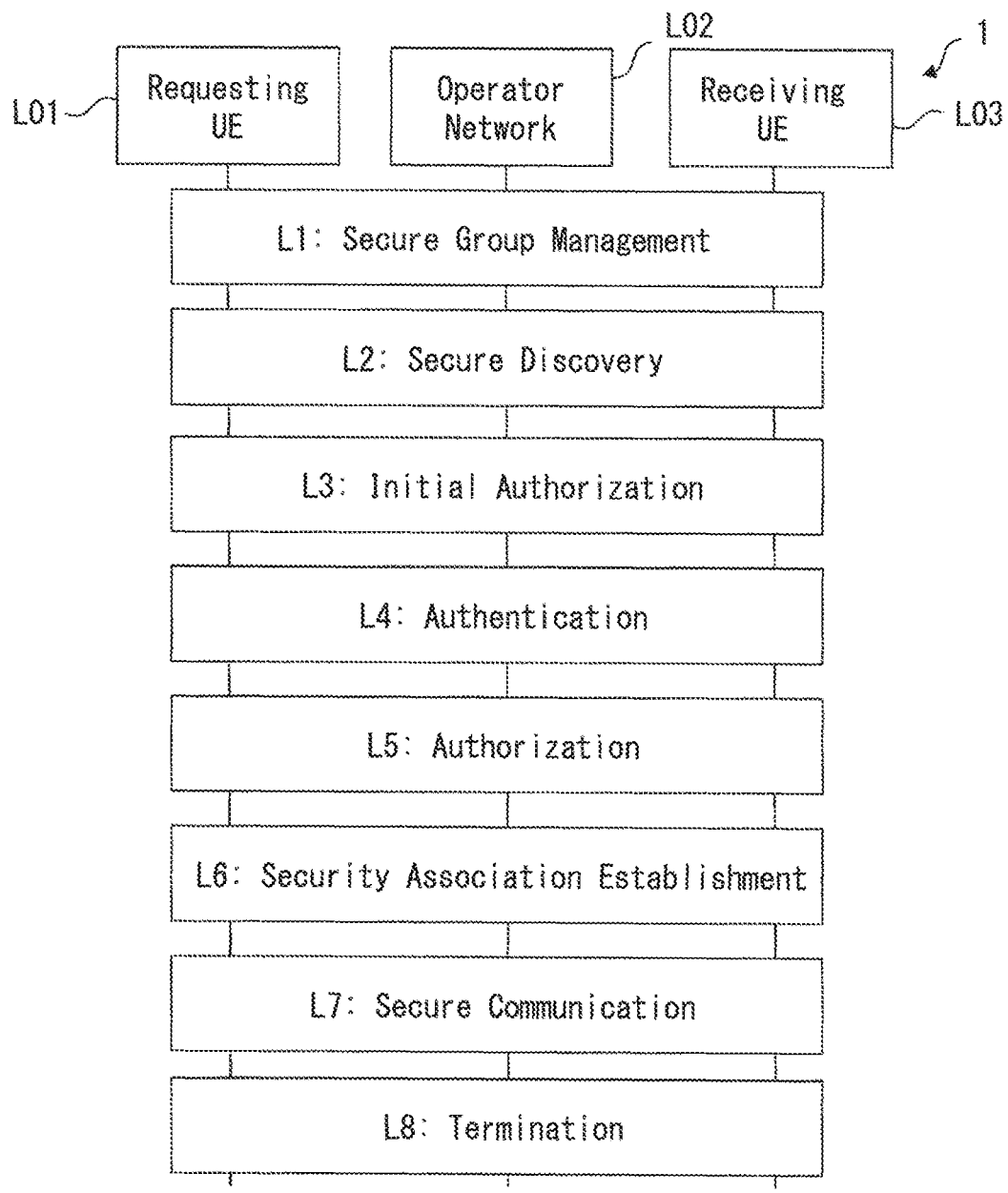
FIG. 3 is a schematic view showing a secure system of an exemplary embodiment of the present invention.

FIG. 3 is a schematic view showing a secure system of an exemplary embodiment of the present invention. As shown in FIG. 3, a secure system 1 of an exemplary embodiment of the present invention includes one or more requesting UEs L01, an operator network L02, and one or more receiving UEs L03. A method of performing a secure communication includes steps of a secure group management L1, a secure discover L2, an initial authorization L3, an authentication L4, an authorization L5, a security association establishment L6, a secure communication L7, and a termination L8, which are performed between UEs (the requesting UE L01, the receiving UE L03) with or without interacting with the operator network L02.

Assuming that the network coverage is available for UEs, broadcasting is presented as an example in this exemplary embodiment, but this exemplary embodiment also applies to multiple-casting and one-to-one communications as shown in FIGS. 1A, 1B, and 2.

From setting up of a group till communication termination, security is needed in each step as described below. Note that steps L1-L4 can be in a different order depending on the service or application.

L1: Secure group management

Members can join securely, members can leave securely, and an authorization level of service and each of the members, and any other required information can be modified securely.

L2: Secure discovery should happen

If discovery is not secured, a device may start communication with a wrong party or a rogue device, with the result that masquerading attacks can happen that in turn could lead to fraudulent charging. For this purpose, the discovery related communication must be secured, i.e., a UE authenticates identity of other UEs in proximity; integrity protection for discovery and a device should be able to authenticate the message.

L3: Initial Authorization

The initial authorization based on secure discovery will lead to the decision that the discovered device belongs to the group, and thus the next step can start.

L4: Authentication

Once the device is discovered and authorized as a part of the group, there should be a mutual authentication; otherwise there is still a scope of attacks.

L5: Authorization

The next level of authorization will find out what services can be used between the devices which belong to the same group. For example, a UE is allowed to send and receive different types of messages or is only allowed to receive broadcasting messages.

L6: Security association establishment (Key derivation and management)

The UEs which belong to the same group should have keys to protect their communication such that other UEs which do not belong to the group or an attacker cannot eavesdrop or alter the messages.

L7: Secure communication

The communication between UEs in the same group can be protected by the security association, with integrity and/or confidentiality protection according to the subscription service type.

L8: Termination

The secure termination can provide security when UE(s) suspend or terminate the communication, or when the entire group communication is terminated.

Figure 4:
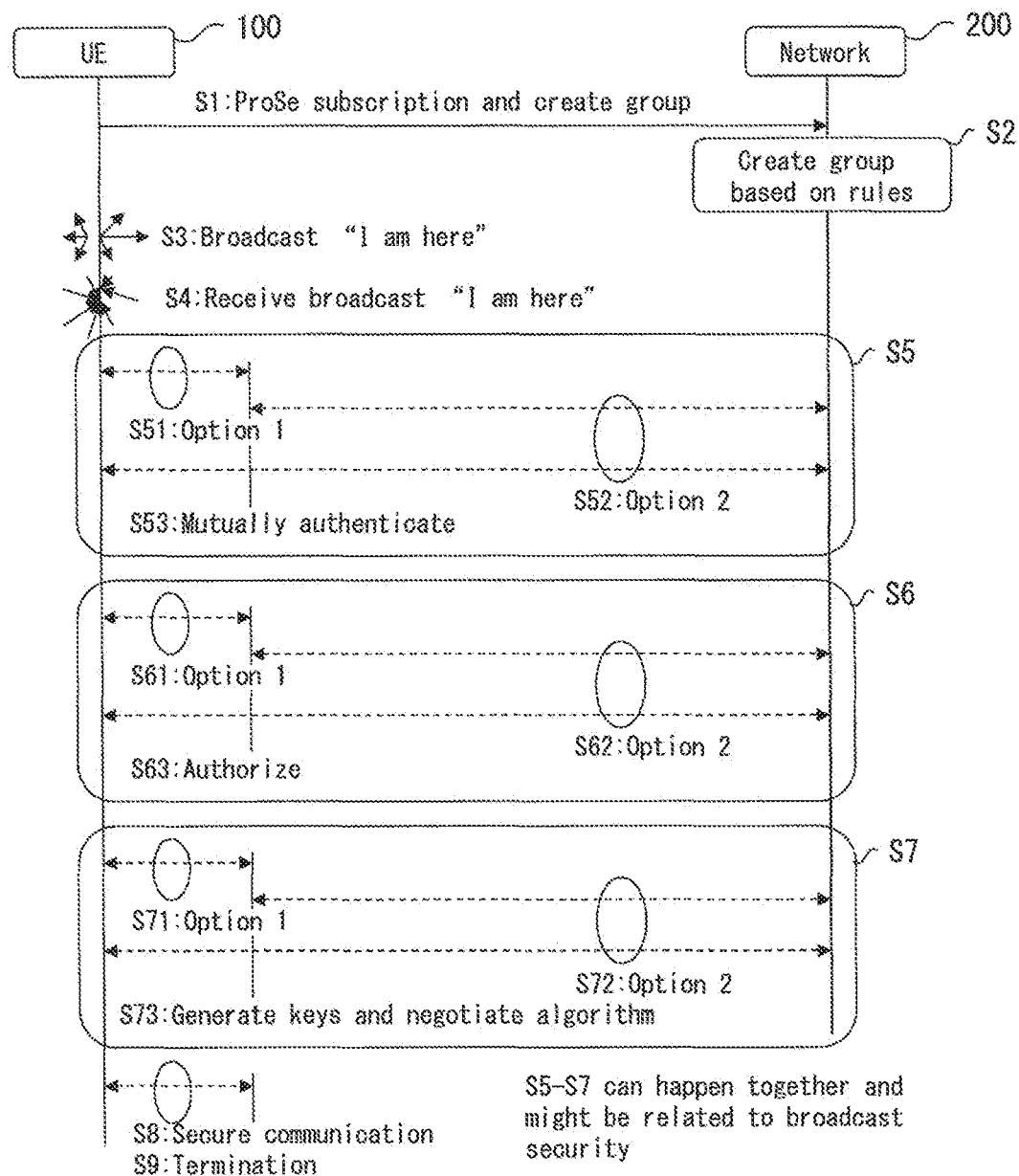
FIG. 4 is a sequence diagram explaining a method of making a secure communication of an exemplary embodiment of the invention.

The detailed method of performing a secure communication of an exemplary embodiment of the invention that fulfills the security requirements will be explained in the following sections. FIG. 4 is a sequence diagram explaining a method of making a secure communication between UE 100 and network 200 of an exemplary embodiment of the invention.

[1] Group Setting and Management (L1)

A group can be (1) two devices communicating with each other (one-to-one), or (2) more than two devices (one-to-many) where one UE can communicate with the other devices.

(3) more than two devices (many-to-many) that can communicate with each other.

A group can be set up for different communication purposes, and group members can be changed. To form a group, the operator network L02 can check the requesting UE L01 which requests the UE L03 which it wants to communicate with, verify devices if they can communicate with each other, and inform the verified devices at both sides (the requesting UE L01 and the receiving UE L03) of the request and formation.

Hereinafter one example of creating a group will be explained. As shown in FIG. 4, a UE 100 requests ProSe subscription to a network 200 and creates a group (Step 1). In step 1, the UE 100 needs to meet conditions, that is policy, e.g. interest, specific location etc. Also the network 200 needs to verify whether UE meets conditions, that is policy, e.g. proximity range, subscription, home network in case of roaming UE, WiFi or not, ProSe enabled, etc. The group is strictly formed, for example, the members of the group should be registered in a whitelist, or the group is dynamically formed on a request from the UE 100, or by the network 200 if the network 200 knows all UE conditions.

For creating a secure group, UEs 100 must agree to be a part of the group, and only "agreed" UEs 100 become group members. A group management includes adding group members, removing group members, ending the group, and adding temporary group members. Each UE 100 can see who is in proximity from e.g. a social network application, and requests for ProSe service, and the ProSe server needs to perform the authorization, but does not have to perform discovery.

[2] Discovery—Secure Detection of UEs in Proximity (L2)

Discovery and group creation in [1] can happen at the same time or be independent procedure.

There can be following three means that a UE (the requesting UE L01) can discover other UEs (the receiving UEs L03) in proximity: (1) Broadcast based, (2) Network based, and (3) Device service level information based. How secure discovery can be done will be described as follows.

[2-1] Broadcast Based Solution

There are six ways (s1-s6) in Broadcast based solution:

(s1) Token

The broadcast message can contain a token that only the given UEs can have. The token should be used only once to prevent the receiving side from reusing it. In order to reach that, the UEs can calculate a token each time on receiving the broadcast message, or the network can inform all the UEs of the token to be used next. This can be used for such a use case as an information notification kind of service, since the token can be reused by the receiving side.

(s2) Signing Message

The broadcast message can be signed by a key that can be verified either by the receiving UEs or by the network for the receiving UEs. Signing can happen by different key management solutions or it can happen using the current keys for communicating with the infrastructure network (or derivation from current keys)—a new key hierarchy might be needed here.

(s3) Message ID

The broadcast message can have an ID that can be verified during the authentication and is used initially only for authorization.

(s4) Random Value

The broadcast message can contain a random value that can only be generated by the network and UE. Verification of the random value is done by the network on behalf of communicating UEs.

(s5) Key

Each UE has a specific key belonging to other devices, and thus it sends a potentially long broadcast or a new type of broadcast that is sent in pieces with encrypted/integrity protected parts for each UE in the group.

(s6) Stamp

The broadcast message can be signed with time-stamp and life-time. Note that this life-time can be a very short period or can last until the next broadcast.

[2-2] Network Based Solution

A network can provide information. For this purpose, the network can use the location information received from the UE (the requesting UE L01), and the location information can be protected by the existing network security mechanism.

[2-3] Device Service Level Information Based Solution

The requesting UE L01 can use location information provided by a social network or other services. Security can be ensured in an application layer.

Detailed examples of the discovery will be explained. The UE 100 can set features and/or capabilities of Discovery/Discoverable in D2D (device-to-device communication) server.

Case 1A:

If the UE 100 does not know whether the other UEs are in proximity, the UE 100 can request the ProSe server for the ProSe service, and the ProSe server can send out the request for the ProSe service and meanwhile get the other UEs location information.

Case 2A:

If the UE 100 can see who is in proximity from e.g. a social network application, and asks for service, the ProSe server needs to perform the authorization but does not have to perform Discovery.

If the ProSe server performs the authorization, the UEs 100 enable the ProSe and/or UEs 100 to be allowed to get given service/communication means.

If the discovery is done based on the proximity of UEs 100, the UE 100 sends location information periodically protected by a unicast security context. The network 200 requests location information when needed or periodically. The request (step 3) can be broadcasted, and the broadcasted message requires security. The response (step 4) can be protected by the unicast security context.

The Network stores the conditions for proximity, which can also be given by the requesting and receiving UE. The network 200 can broadcast to the receiving UEs in a neighborhood which are allowed to be discovered, and the UEs respond with protected messages. The UE 100 informs the network 200 of its conditions and capabilities at a first communication and/or registration or when any change happens.

The broadcast based solutions by the network 200 or the UE 100 require one or more of the following requirements. That is, the receiving side should be able to verify the source, the broadcast message should not be re-used, the network 200 which receives the response should be able to verify it, or the response should be discarded if it is too long. The UE 100 can use one or more of solutions for performing secure discovery. The solutions include a token, a sign, a message, a message ID, a random value, keys, and stamps. Note that those solutions can be used in the step 5 (mutually authenticate, the authentication L4), in the step 6 (authorize, the authorization L5), and in the step 7 (generate keys and negotiate algorithm, the secure communication L7), as shown in FIG. 4. The steps 5 to 7 can happen together, and might be related to broadcast security.

[3] Initial Authorization (L3)

The initial authorization varies according to the above discovery solution.

[3-1] Broadcast Based:

Whether the requesting UE L01 is allowed to communicate with the receiving UE L03 can be checked by a network or by the receiving UE L03 having a proof provided by the network.

[3-2] Network Based:

The requesting UE L01 and the receiving UE L03 can perform a mutual authentication over the direct wireless interface.

[3-3] Device Service Level Information Based:

The receiving UE L03 checks a list maintained by the user or in a UE among the members of the group of devices for ProSe service purpose.

[4] Authentication (L4)

Once the requesting UE L01 is identified as belonging to the same group, then authentication takes place. Authentication can be carried out locally or by interacting with the network.

[4-1] Authentication of the Requesting UE L01:

This can be performed by successful identification of the requesting UE L01 by a network or a UE with a proof from a network.

[4-2] Authentication of the Receiving UE L03:

This can be performed by

[4-2-i] using a key shared between the requesting UE L01 and the receiving UE L03

[4-2-ii] using current network security keys or new keys

[4-2-iii] a network which informs the requesting UE L01 of the incoming authentication request from the receiving UE L03.

[5]Authorization—Service Access Control (L5)

There should be different levels for access control to services that the requesting UE L01 and the receiving UE L03 (hereinafter also referred to as "UE") can use within the group.

[5-1]UE is allowed to receive and/or send a broadcasting message.

[5-2]UE is allowed to receive and/or send multiple messages.

[5-3]UE is allowed to receive and/or send a message for one-to-one communications.

[5-4] UE authorization according to subscription information and the policy UE set for ProSe service.

A network can set up and provide the policy to the group members including the requesting UE L01 and the receiving UE L03 according to UE capabilities and user subscriptions.

The network 200 performs authorization for the UEs 100 want to join the group. The group member of UEs 100 verify whether other UEs are authorized by the network by using the session keys. Another method for performing validated authorization is done by (1) a network sending an authorization value to each UE 100, and each UE 100 uses this value to perform authorization on each other, or (2) Yet another method for performing a validated authorization is done by sending an authorization value from a requesting UE to a receiving UE, and then the receiving UE requests the Network to validate this authorization value and receiving result.

[6] New Key Hierarchy and Key Management (L6)

A new key hierarchy is presented in this exemplary embodiment of the invention. Key Kp is a key related to the group and also may related to a ProSe service. It has an indicator KSI_p related to it. Kp can be sent from ProSe Server to use.

Keys, Kpc and Kpi are session keys that are derived from Kp at UEs. Kpc is a confidentiality key and Kpi is an integrity protection key. The session keys are used for UE to perform authorization for each other, and ProSe communication setup, and have the direct communication between them.

After authorization and authentication, the communicating devices including the requesting UE L01 and the receiving UE L03 can start sessions to communicate with each other. When the requesting UE L01 and the receiving UE L03 communicate with each other, they should share communication keys. The keys can be a group key, and/or a unique key per communicating device as well as a session key per each session.

The key can be managed by the network and sent over the secure communication channel with the network. Alternatively, the key can be managed by the requesting UE L01 and sent to other devices including the receiving UE L03 in the communication, over a secure unicast communication channel that can be secured by the network during authentication or verification. The key can also be issued by a third trusted party.

Figure 5A:
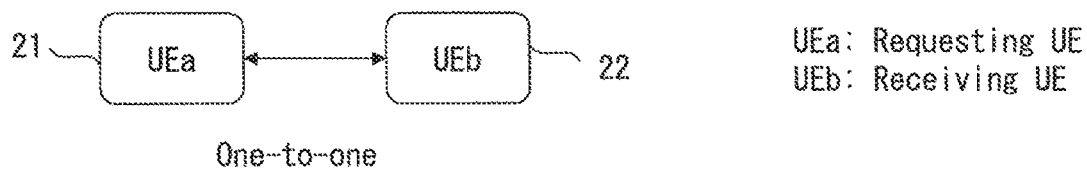
FIG. 5A is a schematic view showing a One-to-one session.
Figure 5B:
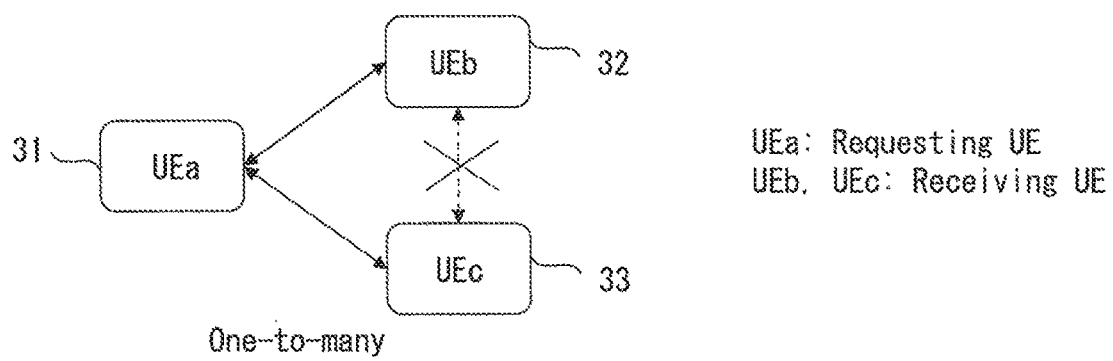
FIG. 5B is a schematic view showing a One-to-many session.
Figure 5C:
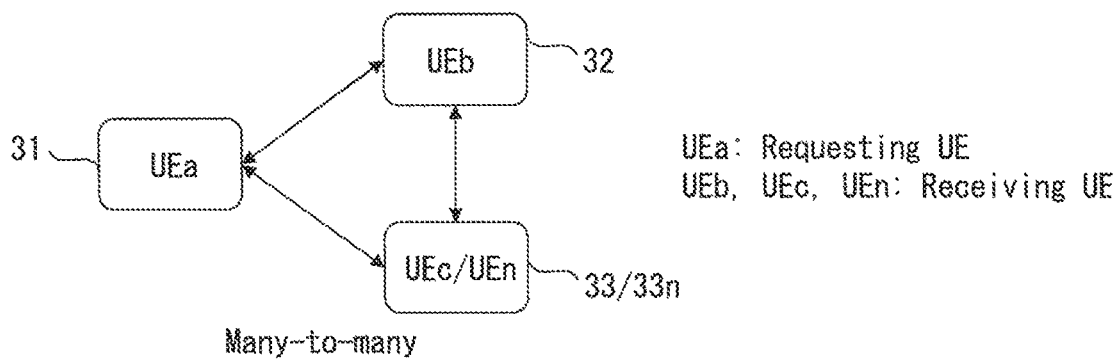
FIG. 5C is a schematic view showing a Many-to-many session.

The UEs 100 authenticate each other at the beginning of a session (S5). The authentication is linked to authorization (S6). FIGS. 5A to 5C are schematic views showing One-to-one, One-to-many, and Many-to-many sessions, respectively. As shown in FIGS. 5A to 5C, a UEa 21 and a UEa 31 indicate the requesting UE L01, and a UEb 22, a UEb 32, a UEc 33 and a UEn_33n indicate the receiving UE L03.

When the session is started, firstly session keys are generated. In this exemplary embodiment, the requesting UE L01 (UEa 21, the UEa 31) and the receiving UE L03 (UEb 22, the UEb 32, the UEc 33, the UEn_33n) use two kinds of keys including session keys.

Case 1B:

Each group has a key Kp for each service (Kp is served as a service key) and a new session key is created for each session.

Case 2B:

Each group has the key Kp (Kp is served as a group key), and a new session key is created for each session.

In each case, either the ProSe server or the requesting UE L01 sends keys. For example, the ProSe server sends the key Kp to the requesting UE L01 and the receiving UE(s) L03, and the requesting UE L01 sends a session key to the receiving UE(s) L03 every session. Alternatively, the ProSe server sends both of the key Kp and the session key to the requesting UE L01 and the receiving UE(s) L03, or the requesting UE L01 sends both of the key Kp and the session key to the receiving UE(s) L03.

Further, when the group changes if someone leaves or is added, when a session ends or a key times out, or when the ProSe server has made a decision, for example, the key Kp and/or the session key should be changed.

If the ProSe Server allocates the key Kp to UEs, UEs derive session keys from that for authorization and communication. UEs can be pre-configured with algorithms for key derivation, or the key Kp is related to a KSI (key set identifier) and a service. Because of them, the security problems during UEs' authentication and authorization or the security problems of a key for direct communication may be solved.

Note that the key set identifier (KSI) is a number which is associated with the cipher and integrity keys derived during the authentication. The key set identifier can be allocated by the network and sent with the authentication request message to the mobile station where it is stored together with a calculated cipher key CK and an integrity key IK. The purpose of the key set identifier is to make it possible for the network to identify the cipher key CK and integrity key IK which are stored in the mobile station without invoking the authentication procedure. This is used to allow re-use of the cipher key CK and integrity key IK during subsequent connections (session).

[7] Secure Communication (L7)

Secure communication can provide message transmission availability between group member UEs, as well as preventing a message from being eavesdropped on or altered by UEs that do not belong to the group. Also the secure communication can prevent UE from using an unauthorized service.

The communication within the group should have integrity and/or confidentiality protection. All the communications can be protected by the session keys described above, after the security association is established.

The security policy can be a negotiation and an agreement within the group with or without the support of the operator network L02. All the group members should follow the security policy.

Next, the security in the case where UEs' location change happens will be explained. If none of UEs has a location change, there is no security issue. Further, if all of the UEs have a changed location, but stayed in proximity to each other, then there is still no security issue.

If a part of UEs (one or more UEs) have moved out of proximity from other UEs and they do not use the ProSe service, group and security management need to be updated for the remaining UEs in the group. Alternatively, if one or more UEs have moved out of proximity from the UEs and they want to keep the ProSe service with each other, group and security management need to be updated for the remaining UEs in the group, and a new group and security are needed for the traveler.

Note that the ProSe Server should get UE location information from GMLC (Gateway Mobile Location Center) periodically, to compare and compute the location differences of all UEs.

[8] Termination (L8)

When the communication is to be suspended, devices should remove the session key while keeping information of the authentication and authorization.

When the communication is to be terminated, the devices can keep history information, or the allocated token with a lifetime for the next use time to prevent signaling for authentication and authorization again.

Smooth handover from an infrastructure to a direct mode will require creation of a key between communicating parties (the requesting UE L01 and the receiving UE L03) before a handover happens. For example, if communicating parties are using WiFi, a key should be allocated to WiFi AP and UEs. The WiFi AP and UEs should authorize and authenticate each other. The key should have a limited life-time. A network can recognize which WiFi AP the UE can communicate with. UEs can find that there is a WiFi AP nearby and the network verifies the WiFi AP. UEs authenticate with the ProSe Server when UEs connect to a WiFi AP. One option is that the ProSe Function can allocate keys for the UEs to communicate with a ProSe APP Server.

To summarize the above description, the method of making a secure communication of an exemplary embodiment includes the following features:

(1) The operator network L02 determines whether the requesting UE L01 can communicate with the receiving UE L03 requested by the requesting UE L01.
(2) Security in discovery of UEs in proximity can be provided by using a token, a key, and signing provided by the network.
(3) Security in discovery of UEs in proximity can be provided by using a location provided by the operator network L02.
(4) Security in discovery of UEs in proximity can be provided by using location information provided by social network services, with security provided in an application layer.
(5) Authorization of the devices can be performed by the network or by devices direct verification.
(6) Mutual authentication between the requesting UE L01 and the receiving UEs that agreed to be in the group L03 can be carried out by the network and also both UEs can be informed with the result.
(7) Mutual authentication between the requesting UE L01 and the receiving UEs L03 can be carried out by both ends with a key shared there between.
(8) New keys for securing the ProSe communication which are a group key and a unique session key can be used.
(9) Security policy in a group for secure communication is negotiated and set.
(10) Termination management can be performed to prevent the same keys from being used and set up a security context for other communication.

According to the secure system of an exemplary embodiment, the operator network L02 can determine the receiving UE(s) L03 with which the requesting UE L01 can communicate, and can ensure secure discovery by either providing security parameters to the requesting UE L01 or receiving UE L03, and providing location information of the receiving UE L03 to the requesting UE L01. Furthermore, the operator network L02 can perform authentication and authorization for the requesting UE L01 and receiving UE L03, and can support security association between UEs to secure ProSe communication.

[9] A Detailed Method of Performing the Authentication and Authorization

Next, a more detailed method of performing the authentication and authorization, and establishing the security association with each other for the direct communication will be explained.

As described above, there are three types of direct communication between UEs, i.e. 1) One-to-one, 2) One-to-many, and 3) Many-to-many as shown in FIGS. 5A, 5B, and 5C, respectively.

A UEa is a Requesting UE. A UEb, a UEc, and other UEs are Receiving UEs. The UEs set up direct communication with each other and protect the communication with keys they share.

A new key hierarchy is presented in this invention. Key Kp is a key related to the ProSe service ID, and has an indicator KSI_p related to it. Kp can be sent from the ProSe Server to UEs in a ProSe Service Result message, or can be sent from the ProSe Server when UEs are registered to the ProSe Server. Kpc and Kpi are session keys derived from Kp at UEs. Kpc is a confidentiality key and Kpi is an integrity protection key. The session keys are used for ProSe communication setup and the direct communication between them.

Assuming that UEs are authenticated to the network and registered to the ProSe Server. The Discovery procedure is completed as described above. The detail message sequence and description of the three cases are given below.

One-to-One Direct Communication

There are only two UEs in proximity having direct communication with each other. In one-to-one communication, Kp can also be allocated to UEs at UE registration to the ProSe server. Considering the one-to-one type of communication is rather for a dynamic demand, not dedicated to a certain type of service, it is more efficient that the ProSe server distributes the keys when the communication is required.

Figure 6:
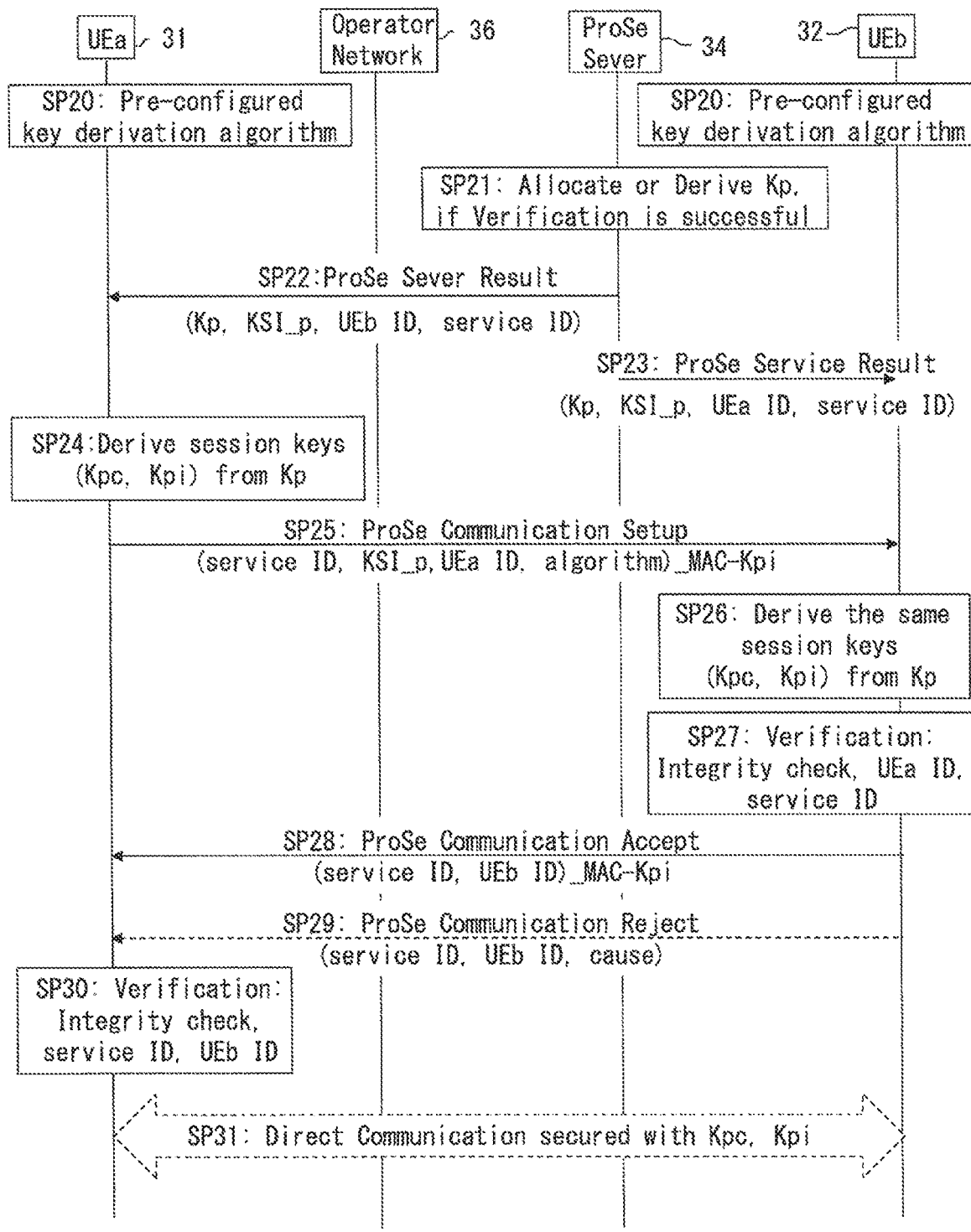
FIG. 6 is a sequence diagram showing One-to-one communication of an exemplary embodiment of the present invention.

FIG. 6 is a sequence diagram showing One-to-one communication of an exemplary embodiment of the present invention. As shown in FIG. 6, the system includes a UEa 31, a UEb 32, a ProSe server 34, and an operator network 36. The method includes the following 12 steps.

SP20: The UEa 31 and the UEb 32 are pre-configured with key derivation algorithms, respectively.

SP21: When the Verification in [4] step 8 is successfully completed, the ProSe server 34 can allocate (an existing) or derive (a new) key Kp.

SP22: The ProSe server 34 sends Kp, KSI_p, UEb ID, and a service ID in the ProSe Service Result to the UEa 31.

SP23: The ProSe server 34 sends Kp, KSI_p, UEa ID, and a service ID in the ProSe Service Result to the UEb 32.

SP24: The UEa 31 derives the session keys Kpc and Kpi from the Kp which is received from the ProSe server 34.

SP25: The UEa 31 sends ProSe Communication Setup to UEb 32 with a service ID, KSI_p, UEa ID, and an algorithm for session key derivation. This message is integrity protected with Kpi.

SP26: The UEb 32 derives the same session keys Kpc and Kpi from the Kp which is received from the ProSe server 34. The UEb 32 can determine which Kp is to be used according to the KSI_p and the service ID received in SP25.

SP27: The UEb 32 performs integrity check on the message received in SP25 with the derived Kpi. The UEb 32 can also further check if the UEa ID and service ID are the same as those received in SP23.

SP28: If the Verification at SP27 is successful, the UEb 32 sends a ProSe Communication Accept with the service ID and UEb ID to the UEa 31. The message is integrity protected with Kpi. It goes to SP30.

SP29: If the Verification at SP27 fails, the UEb 32 sends a ProSe Communication Reject with the service ID, UEb ID, and a proper cause to the UEa 31.

SP30: The UEa 31 performs integrity check on the ProSe Communication Accept with the Kpi. The UEa 31 can also further check UEb ID and service ID. Direct Communication can start thereafter if the verification is successfully completed.

SP31: Direct communication starts between the UEa 31 and the UEb 32. The messages can be confidentiality and/or integrity protected by the session keys Kpc and Kpi.

One-to-many Communication

There is a group of UEs having direct communication in which the requesting UE can send broadcasting messages to other member UEs in the group, and other member UEs can communicate with the requesting UE but do not communicate with other UEs in the same group.

In this exemplary embodiment, two options for how Kp can be allocated to UEs will be explained. The following is option 1 that Kp is sent from the ProSe server 34 in ProSe Service Result, which is the same as in One-to-one communication shown in FIG. 6.

Figure 7:
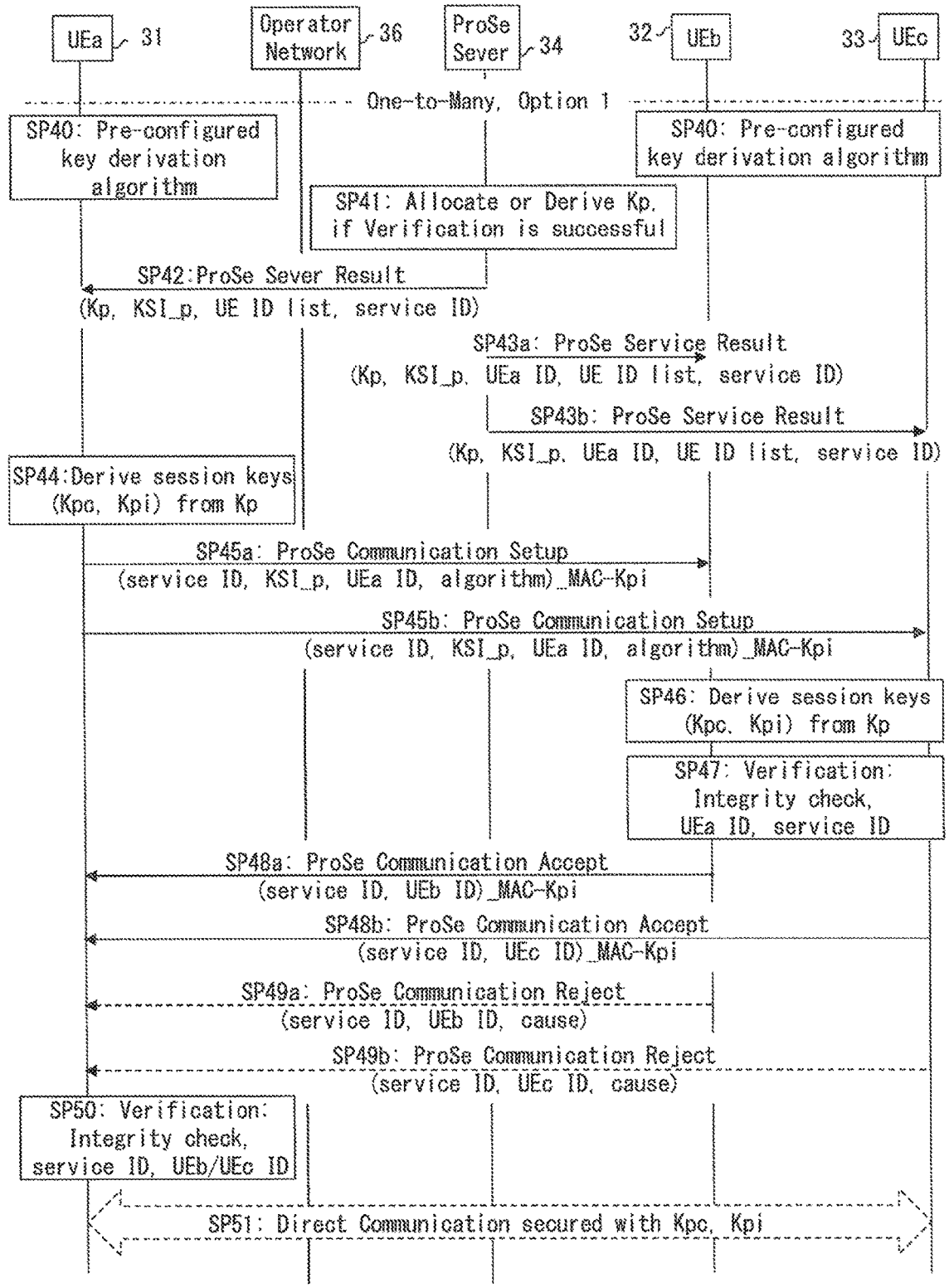
FIG. 7 is a sequence diagram showing the option 1 of One-to-many communication of an exemplary embodiment of the present invention.

FIG. 7 is a sequence diagram showing the option 1 of One-to-Many communication of an exemplary embodiment of the present invention. As shown in FIG. 7, the method includes the following steps.

SP40: The UEa 31, the UEb 32, and the UEc 33 are pre-configured with key derivation algorithms, respectively.

SP41: When the Verification in [4] step 8 is successfully completed, the ProSe server 34 can allocate (an existing) or derive (a new) key Kp.

SP42: The ProSe server 34 sends Kp, KSI_p, a UE ID list of the allowed UEs, and a service ID in the ProSe Service Result to the UEa 31.

SP43a and SP43b: The ProSe server 34 sends Kp, KSI_p, UEa ID, UE ID list of the allowed UEs, service ID in the ProSe Service Result to the UEb 32 and the UEc 33, respectively.

SP44: The UEa 31 derives the session keys Kpc and Kpi from the Kp which is received from the ProSe server 34.

SP45a and SP45b: The UEa 31 sends ProSe Communication Setup to the UEb 32 and UEc 33 with a service ID, KSI_p, UEa ID, and an algorithm for session key derivation, respectively. This message is integrity protected with Kpi.

SP46: The UEb 32 and UEc 33 derive the same session keys Kpc and Kpi from the Kp which is received from the ProSe server 34, respectively. The UEb 32 and UEc 33 can determine which Kp is to be used according to the KSI_p and service ID received in SP45a and SP45b, respectively.

SP47: The UEb 32 and UEc 33 perform integrity check on the message received in SP45a and SP45b, respectively, with the derived Kpi. The UEb 32 and UEc 33 can also further check if the UEa ID and service ID are the same as those received in SP43a and SP43b, respectively.

SP48a and SP48b: If the Verification at SP47 is successful, the UEb 32 and UEc 33 send ProSe Communication Accept with a service ID and a UEb/UEc ID to the UEa 31, respectively. The message is integrity protected with Kpi. It goes to SP50. SP49a and SP49b: If the Verification at SP47 fails, the UEb 32 and UEc 33 send ProSe Communication Reject with the service ID, UEb/UEc ID, and a proper cause to the UEa 31, respectively.

SP50: The UEa 31 performs integrity check on the ProSe Communication Accept with the Kpi. The UEa 31 can also further check UEb/UEc ID and service ID. Direct Communication can start thereafter if the verification is successfully completed.

SP51: Direct communication starts between the UEa 31 and the UEb 32, or the UEa 31 and the UEc 33. The messages can be confidentiality and/or integrity protected by the session keys Kpc and Kpi.

The following is the option 2 that receiving UEs (UEb 32, UEc 33) receive Kp at registration to the ProSe server 34. In this option, the ProSe server 34 does not need to send the ProSe Service Result to each of the receiving UEs (UEb 32, UEc 33). This will save network resource when there are many UEs in the group for direct communication.

Figure 8:
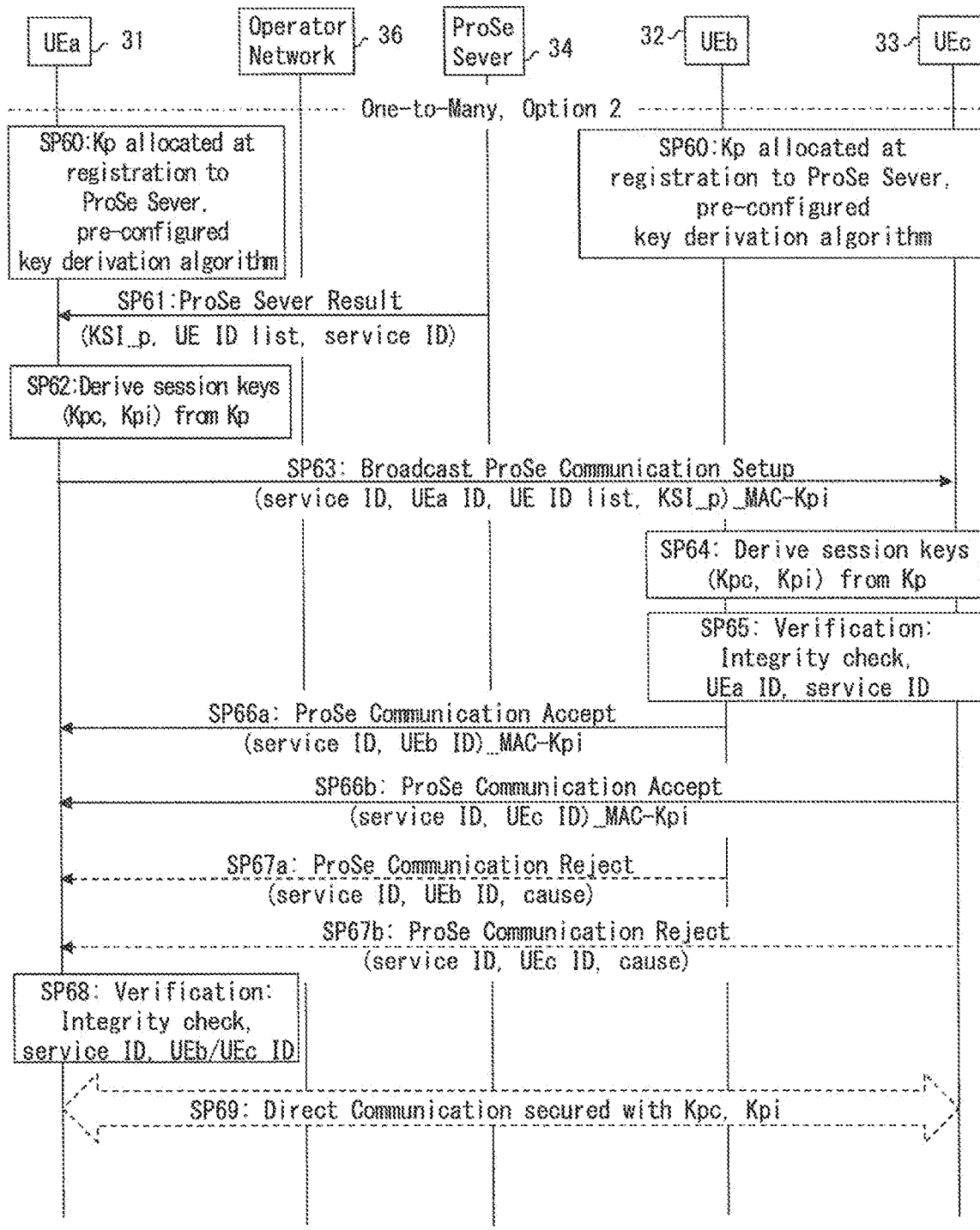
FIG. 8 is a sequence diagram showing the option 2 of One-to-many communication of an exemplary embodiment of the present invention.

FIG. 8 is a sequence diagram showing the option 2 of One-to-Many communication of an exemplary embodiment of the present invention. As shown in FIG. 8, the method includes the following 10 steps.

SP60: Kp is allocated to UEs when they are registered to ProSe server 34. The UEa 31, UEb 32, and UEc 33 are pre-configured with key derivation algorithms, respectively.

SP61: The ProSe server 34 sends KSI_p, a UE ID list of the allowed UEs, and a service ID in the ProSe Service Result to the UEa 31.

SP62: The UEa 31 derives the session keys Kpc and Kpi from the Kp.

SP63: The UEa 31 broadcasts ProSe Communication Setup to the UEs in the UE ID list, with the service ID, UEa ID, UE ID list, and KSI_p. This message is integrity protected with Kpi.

SP64: UEs having received the broadcast message sees if it is on the list, and derives the same session keys Kpc and Kpi from the Kp. UEs can determine which Kp is to be used according to the KSI_p and service ID received in SP63.

SP65: The UEb 32 and UEc 33 perform integrity check on the broadcast message with the derived Kpi. The UEb 32 and UEc 33 can also further check the UEa ID and service ID, if there are pre-configured criteria, respectively.

SP66a and SP66b: If the Verification is successful, the UEb 32 and UEc 33 send ProSe Communication Accept with a service ID and UEb/UEc ID to the UEa 31, respectively. The message is integrity protected with Kpi. It goes to SP68.

SP67a and SP67b: If the Verification fails, the UEb 32 and UEc 33 send ProSe Communication Reject with the service ID, UEb/UEc ID, and a proper cause to the UEa 31, respectively.

SP68: The UEa 31 performs integrity check on the ProSe Communication Accept with the Kpi. The UEa 31 can also further check the UEb/UEc ID and service ID. Direct Communication can start thereafter if the verification is successfully completed.

SP69: Direct communication starts between the UEa 31 and the UEb 32, or the UEa 31 and the UEc 33. The messages can be confidentiality and/or integrity protected by the session keys Kpc and Kpi.

Many-to-many Communication

Figure 9:
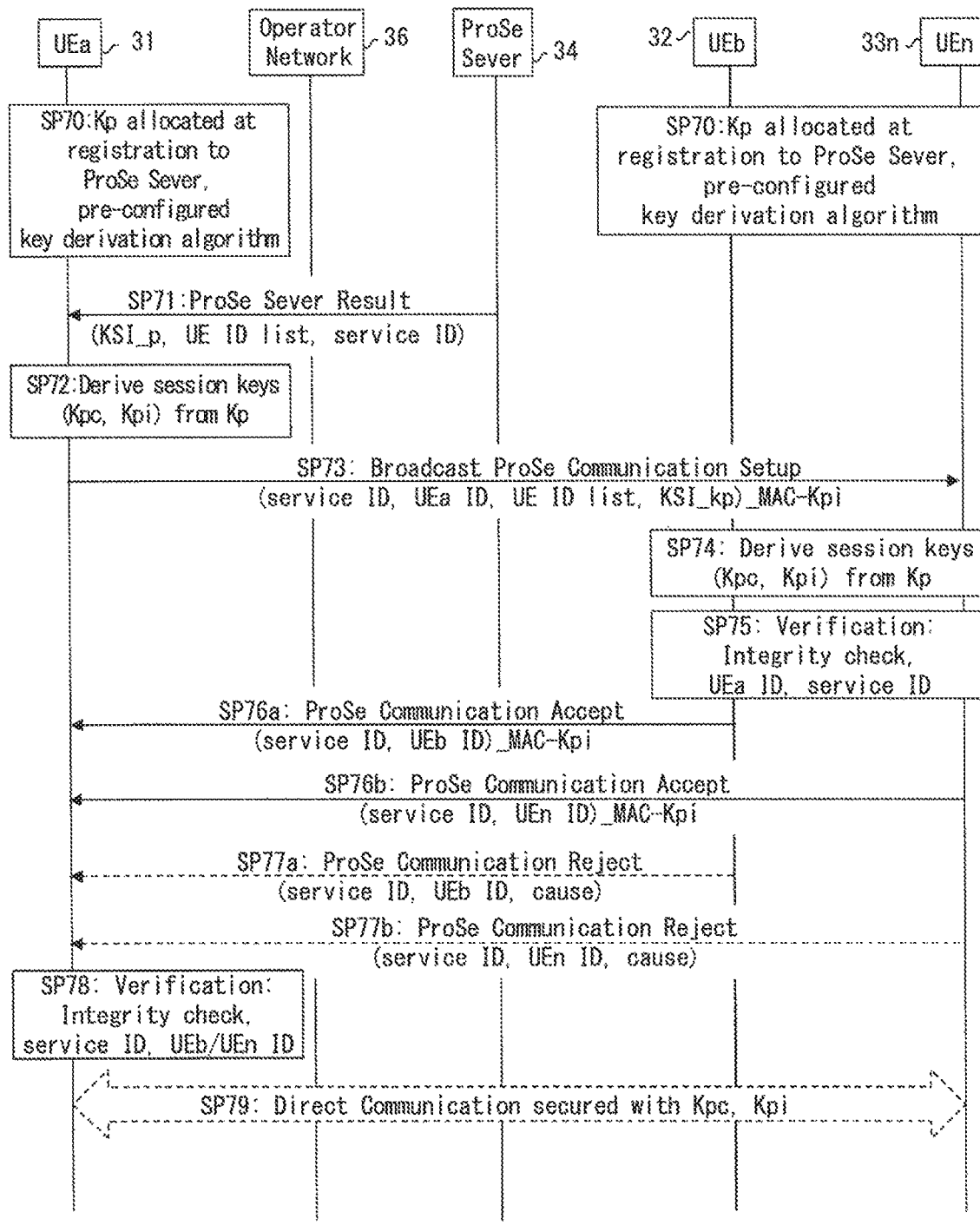
FIG. 9 is a sequence diagram showing Many-to-many communication of an exemplary embodiment of the present invention.

In Many-to-many communication, each UE can communicate with any other UEs in the group. FIG. 9 is a sequence diagram showing Many-to-many communication of an exemplary embodiment of the present invention. As shown in FIG. 9, the method includes the following 10 steps.

SP70: Kp is allocated to UEs when they are registered to the ProSe server 34. The UEa 31, UEb 32, and UEn 33n are pre-configured with key derivation algorithms, respectively.

SP71: The ProSe server 34 sends KSI_p, a UE ID list of the allowed UEs, and a service ID in the ProSe Service Result to the UEa 31.

SP72: The UEa 31 derives the session keys Kpc and Kpi from the Kp.

SP73: The UEa 31 broadcasts ProSe Communication Setup to the UEs in the UE ID list, with the service ID, UEa ID, UE ID list, and KSI_p. This message is integrity protected with Kpi.

SP74: UEs having received the broadcast message sees if it is on the list, and derives the same session keys Kpc and Kpi from the Kp, respectively. UEs can determine which Kp is to be used according to the KSI_p and service ID received in SP73, respectively.

SP75: The UEb 32 and UEn 33n perform integrity check on the broadcast message with the derived Kpi, respectively. The UEb 32 and UEn 33n can also further check UEa ID and service ID, if there are pre-configured criteria, respectively.

SP76a and SP76b: If the Verification is successful, the UEb 32 and UEn 33n send ProSe Communication Accept with the service ID and UEb/UEn ID to the UEa 31, respectively. The message is integrity protected with Kpi. It goes to SP78.

SP77a and SP77b: If the Verification fails, the UEb 32 and UEn 33n send ProSe Communication Reject with the service ID, UEb/UEn ID, and a proper cause to the UEa 31, respectively.

SP78: The UEa 31 performs integrity check on the ProSe Communication Accept with the Kpi. The UEa 31 can also further check the UEb/UEn ID and service ID. Direct Communication can start thereafter if the verification is successfully completed.

SP79: Direct communication starts between UEs. The messages can be confidentiality and/or integrity protected by the session keys Kpc and Kpi.

To summarize the above description, a method of performing authentication and authorization of an exemplary embodiment includes the following features:

(1) New key hierarchy for UEs direction communication: Kp and session keys Kpc and Kpi. Kpc is for encryption and Kpi is for integrity protection. Both Kpc and Kpi are derived from Kp.

(2) Kp is related to a key identifier KSI_p and also a service ID, such that UEs can keep the synchronization and verify whether the key is proper for the requested service.

(3) The ProSe server distributes Kp to UEs when UEs are registered to the ProSe server, or in the ProSe Service Result message.

(4) UEs are pre-configured with algorithms for session key derivation. By the KSI_p, service ID and indicated algorithm, the receiving UEs can derive the same session keys.

(5) Integrity key Kpi is used to protect the communication request from the requesting UE, such that the receiving UE can perform integrity check and verify whether the message is from an authorized source.

(6) Receiving UE can also verify whether all the service ID, the requesting ID, and the key match.

(7) ProSe Communication Accept is integrity protected by the receiving UE such that the requesting UE can verify its integrity.

(8) Direct communication between UEs can be confidentiality and/or integrity protected with the session keys Kpc and Kpi.

According to the secure system of an exemplary embodiment the invention, the key distributed from a network element ProSe server enables the UEs which want to establish direct communication to verify whether the other UEs are authorized to have the service. The UEs derive session keys at their ends can prevent keys from being stolen or altered if they are sent from one UE to another.

The Kp is related to a certain service, which prevents the UEs from using the key for other services which they may not be authorized to have. The direct communication between UEs can be secured with the session keys that are shared only between the UEs.

This software can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

This application is based upon and claims the benefit of priority from Japanese Patent Application No. 2013137293, filed on Jun. 28, 2013, the disclosure of which is incorporated herein in its entirety by reference.

REFERENCE SIGNS LIST 1 secure system
10 system
11 UE
12 UE
13 E-UTRAN
14 EPC
15 ProSe Function
16 ProSe APP Server
17 ProSe APP
18 ProSe APP
19 eNB
20 eNB
21 UEa
22 UEb
24 ProSe Server
25 HSS
31 UEa
32 UEb
33 UEc
33n UEn
100 UE
100a system
100b system
200 network
L01 requesting UE
L02 operator network
L03 receiving UE
L1 secure group management
L2 secure discovery
L3 initial authorization
L4 authentication
L5 authorization
L6 security association establishment
L7 secure communication
L8 termination

The invention claimed is:

1. A UE (User Equipment) for one-to-one direct communication, the UE comprising:
   at least one processor; and
   at least one memory coupled to the at least one processor, the memory storing instructions that, when executed by the at least one processor, cause the at least one processor to:
      receive, from another UE, a first message including first information and second information related to a session key;
      derive a confidential key and an integrity key based on the second information;
      perform a first check that the received first information is the same as a first information possessed by the UE;
      perform a second check of an integrity protection on the first message based on the integrity key; and
      perform the one-to-one direct communication with the another UE using the confidentiality key and the integrity key if both the first check and the second check pass.

2. The UE according to claim 1, wherein the another UE checks the integrity protection on a second message received from the UE.

3. The UE according to claim 1, wherein the first message includes an algorithm for key derivation.

4. The UE according to claim 1, wherein the UE and the another UE support ProSe (Proximity Services).

5. The UE according to claim 1, wherein the UE and the another UE get an authorization from a network including at least a ProSe (Proximity Services) Function and a ProSe application server.

6. The UE according to claim 1, wherein the UE and the another UE perform mutual authentication.

7. A communication method of a UE (User Equipment) for one-to-one direct communication, the communication method comprising:
   receiving, from another UE, a first message including first information and second information related to a session key;
   deriving a confidential key and an integrity key based on the second information;
   performing a first check that the received first information is the same as a first information possessed by the UE;
   performing a second check of an integrity protection on the first message based on the integrity key; and
   performing the one-to-one direct communication with the another UE using the confidentiality key and the integrity key if both the first check and the second check pass.

8. The communication method according to claim 7, wherein the another UE checks the integrity protection on a second message received from the UE.

9. The communication method according to claim 7, wherein the first message includes an algorithm for key derivation.

10. The communication method according to claim 7, wherein the UE and the another UE support ProSe (Proximity Services).

11. The communication method according to claim 7, wherein the UE and the another UE get an authorization from a network including at least a ProSe (Proximity Services) Function and a ProSe application server.

12. The communication method according to claim 7, wherein the UE and the another UE perform mutual authentication.

* * * * *